Patented Nov. 11, 1924.

1,514,638

UNITED STATES PATENT OFFICE.

EDWARD H. THOMAS, OF EAST ORANGE, NEW JERSEY, ASSIGNOR TO THOMAS CARBON BLACK COMPANY, A CORPORATION OF NEW JERSEY.

MANUFACTURE OF GAS BLACK.

No Drawing.   Application filed January 17, 1923.   Serial No. 613,293.

*To all whom it may concern:*

Be it known that I, EDWARD H. THOMAS, a citizen of the United States, and a resident of East Orange, county of Essex, and State of New Jersey, have invented certain new and useful Improvements in the Manufacture of Gas Black, of which the following is a specification.

My invention relates to a process of making material known as carbon black or gas black. This material is similar to lamp black but is much more finely divided than that material and does not have the gritty qualities of lamp black. Actually the material which I produce is even more finely divided than the gas black made according to previous processes.

Commercial production of gas black in this country is confined almost entirely to the fields where natural gas is found and where there is no local demand for this gas for domestic or industrial purposes. It is recognized that the production of gas black from the gas is wasteful, and by natural economic laws, if the gas can be put to any other use, the producers cannot afford to burn it for gas black, for by this process only a very small percentage of recovery is had.

According to my invention, gas black of a very high grade can be produced commercially from petroleum and I accomplish this result by a proper combination of the steps of thermal decomposition and burning. That is, I first subject the petroleum to a partial decomposition or cracking, producing a gas with desired constituents and then burn this gas to produce the carbon black. In other words, the carbon black is produced by decomposing the petroleum by both endothermic and exothermic reactions.

I have found that where one wishes to enrich the natural gas with vapors from petroleum oils it is desirable to have these vapors follow a certain sequence of composition. That is, if one tries to mix methane with pentane, the result is not satisfactory because the pentane will readily leave the mixture and liquefy. On the other hand, if the vapors that are mixed with the natural gas contain decreasing quantities of ethane, propane, butane as well as pentane, the gases seem to have an effect on each other and the entire mixture will remain in the gaseous state. Such a series of gases may readily be produced by the thermal decomposition of petroleum and it is within the spirit of my invention to use such gases as a medium for enriching natural gas.

Obviously, to obtain a gas having the higher compounds and the proper stability, from crude petroleum, by direct distillation, would involve utilizing the most valuable part of the oil. I also find that a higher yield of carbon black can be obtained, if, instead of having the saturated form of the higher hydrocarbons, we have present substantial quantities of hydrocarbons containing three and more than three carbon atoms which are unsaturated. At the same time it is highly desirable that a certain amount of ethylene or ethane be present so that the sequence of composition may be maintained. Accordingly I produce a gas which is highly efficient for this purpose, by cracking either crude petroleum or the so-called gas oils which are produced in the refining operation. Ordinarily the cracking process is so conducted as to keep down the percentage of fixed gas to a minimum and to obtain as few unsaturated compounds as possible. For my purposes the opposite result is desired. I wish to convert all of the oil used into gaseous form and to have a high percentage of unsaturated ingredients. I accomplish the desired result by treating the oil at a high temperature under very little pressure. For example, I find that a proper gas can be obtained if fuel oil is sprayed rapidly over brick work that has been heated to about 1400° F., and the spraying continued until the temperature of the brick work drops to not less than 1000° F.; the best results are obtained if the spraying is stopped when the temperature drops to 1250° F. An analysis of the gas so produced shows that it contains a continuous sequence of hydrocarbons having from one up to six carbon atoms and that the saturation of these hydrocarbons varies from full saturation to compounds which appear to belong to the benzine series. This gas ordinarily will remain in the vapor form, and even if the pipes are allowed to get cold, and a certain percentage of the higher compounds liquefies, a substantial percentage of these higher compounds will remain in the gas. It is desirable to have a substantial quantity of methane or hydrogen present in the gas to maintain the heat of combustion during the exothermic decomposition. This can be provided by mixing my cracked gases with natural gas, but usually the cracking process itself will produce enough methane or hydrogen for this purpose.

When a gas has been produced having the desired qualities it may be burned in any well known form of apparatus for this purpose, under conditions which will not supply enough air to complete combustion, and under conditions where the disintegrated carbon may be withdrawn from the zone of the flame. This ordinarily is accomplished by burning the gas from jets while controlling the air supply, and having the flames impinge on a plate on which the carbon is deposited. A relative movement between the flame and the plate is provided so that as the carbon is deposited it passes out of the flame zone. The carbon is then scraped from the plate and collected.

In the history of the gas black art there has been much discussion regarding the advisability of cooling the plate on which the flame impinges. Innumerable suggestions have been made to the effect that it is desirable to cool such plate, but the commercial practice continues to provide no mechanism for such cooling. In studying this situation I have found that if the plate is cooled by water there is a partial yield but the production of carbon is greatly reduced, and the best results are not obtained until a temperature substantially above the boiling point of water is reached. When a temperature of about 270° F. is had on the plate an increased production of carbon is manifested. This production while being substantial at 270° F. reaches a maximum at about 300° F. and as regards the production of carbon alone appears to continue substantially constant until a temperature approximating that of the flame is reached. It may be true that with the ordinary commercial gas where the percentage of carbon produced is very small, high temperatures are not injurious. However, where one is operating according to my process, relatively large volumes of carbon are deposited on the plate and I find that if the plate is not cooled to a certain extent, the carbon will become coked and will lose its value as gas black. I have found that the most efficient way of cooling the plate on which the carbon is deposited is to make this plate hollow and control its temperature by the use of steam. Using this expedient I have been limited as regards the maximum in temperature which can be tested but it is my belief that the plate on which the carbon is deposited should not be allowed to reach a temperature in excess of 500° F. My experience is that if no cooling medium is used, or if the plate is merely cooled by the passage of air over it, then the quality of the carbon is greatly injured.

By producing a gas such as I have suggested and by burning the gas in the manner specified, I produce gas black which contains an appreciable amount of oily material—in some instances as much as 3%. While the nature of this material is uncertain it appears to be a polymer product resulting from the incompleted combustion of the unsaturated hydrocarbons that are present in the gas used. If the black is to be used for the manufacture of paint or ink this oily substance is of value because it renders it easier to compact the product for shipment. When the black is to be used with rubber this oily material is highly undesirable and would largely destroy the value of the product. However, I have discovered that it can be entirely removable by extraction with acetone. When this is done, a carbon black is produced at a low cost adapted for use with rubber.

What I claim is:

1. The process of producing gas black from liquid material of a paraffin series which comprises the steps of partially decomposing such material by endothermic decomposition to produce molecules having a greater relative amount of carbon than those of a paraffin, and then liberating carbon from such molecules by exothermic decomposition under conditions adapted to prevent coking of such carbon.

2. A process of making gas black which comprises the steps of thermally decomposing petroleum products under conditions which will produce a gas containing a mixture of hydrocarbons having one, two, three and more than three carbon atoms and containing substantial quantities of unsaturated hydrocarbons having more than two carbon atoms, burning such gas with a limited supply of oxygen and withdrawing carbon formed by decomposition from the flame before the particles of such carbon are coked by the heat of the flame.

3. The process of making gas black which comprises the step of burning a gas derived by the thermal decomposition of petroleum which contains a mixture of hydrocarbons in the vapor phase having one, two, three and more than three carbon atoms and comprises a substantial percentage of unsaturated hydrocarbons having more than two carbon atoms, under conditions which permit the methane present to be substantially consumed but will not permit all the carbon contained in the higher hydrocarbons to be consumed.

4. The process of making gas black which comprises the steps of burning a gas containing hydrocarbons having one, two, three and more than three carbon atoms under conditions which will yield gas black impregnated with oily material and thereafter extracting the oily material.

5. The process of producing gas black which involves the steps of burning, with a limited supply of oxygen, a gas comprising a mixture of hydrocarbons of which a substantial percentage is a mixed gas comprising hydrocarbons having two and more than two carbon atoms, such gas aggregating not more than twice as many hydrogen atoms as carbon atoms.

6. The process of producing gas black which involves the step of burning, with a limited supply of oxygen, a gas obtained by cracking a heavy petroleum oil at a temperature in excess of 1000° F. and without largely increased pressure, collecting the carbon formed by decomposition under conditions which will prevent the coking thereof, and extracting oily material from such product.

7. A process of producing gas black which comprises the steps of burning the hydrocarbon gas so that the flame impinges on a plate maintained at a temperature between 280° F. and 500° F. and causing relative movement to take place between the plate and the flame.

EDWARD H. THOMAS.